United States Patent [19]

Tajima

[11] Patent Number: 4,481,299

[45] Date of Patent: Nov. 6, 1984

[54] OPTICAL GLASS
[75] Inventor: Hidemi Tajima, Tokyo, Japan
[73] Assignee: Hoya Corporation, Tokyo, Japan
[21] Appl. No.: 602,104
[22] Filed: Apr. 23, 1984

Related U.S. Application Data

[63] Continuation of Ser. No. 428,512, Sep. 29, 1982, abandoned.

[30] Foreign Application Priority Data

Oct. 1, 1981 [JP] Japan ................................. 56-154854

[51] Int. Cl.$^3$ ................................................. C03C 3/10
[52] U.S. Cl. ........................................ 501/73; 501/78; 501/79; 501/903
[58] Field of Search ....................... 501/73, 78, 79, 903

[56] References Cited

U.S. PATENT DOCUMENTS 3,740,242  6/1973  Faulstich et al. .................... 501/903
4,119,471 10/1978  Komorita et al. ..................... 501/78
4,179,300 12/1979  Sagara .................................. 502/79

Primary Examiner—Helen M. McCarthy
Attorney, Agent, or Firm—Sughrue, Mion, Zinn, Macpeak & Seas

[57] ABSTRACT

An optical glass comprising, in % by weight
21.0 to 35.0% $SiO_2$;
0 to 10.0% $B_2O_3$;
0 to 4.0% $Al_2O_3$;
0.5 to 4.0% $Li_2O$;
33.0 to 55.0% $BaO+SrO+CaO+MgO+ZnO$, with the proviso of
19.0 to 45.0% BaO,
0 to 15.0% SrO,
0 to 20.0% CaO,
0 to 5.0% MgO, and
1.5 to 20.0% ZnO;
8.0 to 23.0% $La_2O_3$;
2.0 to 8.0% $ZrO_2$;
0 to 10.0% $TiO_2$;
0 to 4.5% $Nb_2O_5+Ta_2O_5$;
0 to 5.0% $WO_3$; and
0 to 5.0% PbO.

1 Claim, No Drawings

OPTICAL GLASS

This application is a continuation of application Ser. No. 428,612, filed Sept. 29, 1982, now abandoned.

FIELD OF THE INVENTION

The present invention relates to an optical glass having specific optical constants expressed by a refractive index (nd) of 1.67 to 1.75 and an Abbe number ($\gamma$d) of 38 to 52.

BACKGROUND OF THE INVENTION

It has heretofore been required to obtain an optical glass having a high viscosity at melting and a slow crystal growth rate at a temperature below the liquid phase temperature and which is suitable for a direct press molding from a continuous melting furnace, from inexpensive glass raw materials. Also, an optical glass in which coloring and scratches do not almost generate during polish processing and having an excellent chemical durability has been required.

To achieve the above object, a silicate glass is advantageous as compared with a borate glass. However, the silicate glass containing a large amount of $La_2O_3$ has disadvantages such that the stability is poor and a dissolution temperature is high. For these reasons, many conventional optical glasses having the above-described optical constant ranges are glasses that the $SiO_2$ content is small and the $B_2O_3$ content is large or that injurious components such as CdO or $ThO_2$ are contained. However, a glass composition containing a large amount of $B_2O_3$ is difficult to produce a uniform optical glass with a good yield due to a low viscosity at melting, resulting in volitization of some components. Even if an optical glass can be produced, such a glass does not have a sufficient chemical durability.

On the other hand, in the case that $B_2O_3$ as a glass forming material is substituted with $SiO_2$, the liquid phase temperature arises and the solubility is reduced as the amount of substitution increases. To improve these disadvantages, an optical glass containing $Nb_2O_5$ or $Ta_2O$ as an essential component has been proposed as described in, for example, Japanese Patent Publication No. 7124/68 and Japanese Patent Application (OPI) No. 88106/73. Such a glass, however, has disadvantages that the raw materials are expensive and where the amount of $B_2O_3$ is decreased to a certain degree, the melting temperature cannot be reduced.

SUMMARY OF THE INVENTION

As a result of extensive studies on an optical glass satisfying the above-described optical constants and object, it has been found that a stable optical glass having high viscosity and excellent chemical durability can be obtained by using $LiO_2$ and $ZrO_2$, without using $Nb_2O_5$ and $Ta_2O_5$ which are expensive raw materials.

Accordingly, an object of the present invention is to provide an optical glass comprising, in % by weight, 21.0 to 35.0% $SiO_2$;
0 to 10.0% $B_2O_3$;
0 to 4.0% $Al_2O_3$;
0.5 to 4.0% $Li_2O$;
33.0 to 55.0% $BaO+SrO+CaO+MgO+ZnO$, with the proviso of
19.0 to 45.0% BaO,
0 to 15.0% SrO,
0 to 20.0% CaO,
0 to 5.0% MgO, and
1.5 to 20.0% ZnO;
8.0 to 23.0% $La_2O_3$;
2.0 to 8.0% $ZrO_2$;
0 to 10.0% $TiO_2$;
0 to 4.5% $Nb_2O_5+Ta_2O_5$;
0 to 5.0% $WO_3$; and
0 to 5.0% PbO.

DETAILED DESCRIPTION OF THE INVENTION

The criticality of the specific amounts of the glass components set forth above is described below. All percents herein are by weight.

If the amount of $SiO_2$ is below 21.0%, the glass tends to devitrify, and if the amount of $SiO_2$ is larger than 35.0%, the desired refractive index cannot be obtained.

$B_2O_3$ is a component to increase the solubility of the glass and lower the liquid phase temperature of the glass. If the amount of $B_2O_3$ exceeds 10.0%, the chemical durability of the glass is reduced.

$Al_2O_3$ serves to increase the viscosity of the glass. If the amount $Al_2O_3$ exceeds 4.0%, the tendency of the glass to devitrify increases.

$Li_2O$ does not remarkably reduce the refractive index and also does not remarkably deteriorate the chemical durability of the glass, though such is an alkali component. $Li_2O$ is effective to stabilize the glass and particularly improve the solubility of $SiO_2$ even in a small amount thereof and must be present in an amount of 0.5% or more. If, however, the amount of $Li_2O$ exceeds 4.0%, the glass tends to crystallize and the chemical durability of the glass is reduced.

BaO, ZnO, SrO, CaO and MgO must be present in a total amount of 33.0 to 55.0%. If the total amount is below 33.0%, the tendency of the glass to devitrify increases, and if the total amount exceeds 55.0%, the desired refractive index cannot be obtained.

BaO serves to stabilize the glass and must be present in an amount of 19.0% or more. If, however, the amount of BaO exceeds 45.0%, the chemical durability of the glass is reduced.

ZnO serves to stabilize the glass and also improve the chemical durability of the glass and therefore must be present in an amount of 1.5% or more. If, however, the amount of ZnO exceeds 20.0%, the tendency of the glass to devitrify increases.

SrO, CaO and MgO do not render the glass unstable if the amounts of SrO, CaO and MgO are up to 15.0%, up to 20.0% and up to 5.0%, respectively and serve to control the optical constants.

$La_2O_3$ must be present in an amount of 8.0 to 23.0%. If the amount of $La_2O_3$ is below 8.0%, the desired refractive index cannot be obtained. If the amount of $La_2O_3$ exceeds 23.0%, the tendency of the glass to devitrify increases remarkably.

$ZrO_2$ serves to increase the refractive index, stability and viscosity of the glass, improve the chemical durability of the glass and increase the hardness of the glass and must be present in an amount of 2.0 to 8.0%. If the amount of $ZrO_2$ exceeds 8.0%, the tendency of the glass to devitrify increases and the crystal growth rate increases undesirably.

$TiO_2$, $WO_3$ and PbO are used to control the optical constants of the glass in amounts of up to 10.0%, up to 5.0% and up to 5.0%, respectively.

$Nb_2O_5$ and $Ta_2O_5$ are used principally for the purpose of controlling the optical constants of the glass. Since these materials are expensive, the total amount of $Nb_2O_5$ and $Ta_2O_5$ is limited to 4.5% or less.

The present invention will be now explained in greater detail by reference to the following examples but the invention is not to be construed as being limited thereto. The composition of each glass is expressed in % by weight.

EXAMPLES 1 TO 11

Raw materials comprising siliceous stone powder, boric acid, lithium carbonate, barium carbonate, strontium nitrate, zinc flower, titanium oxide and zirconium oxide were uniformly mixed and the mixture was fused at a temperature of about 1,300° C. in a platinum crucible, refined and stirred. The melt was then cast into a preheated mold and gradually cooled to obtain glasses having the compositions shown in the table below. The refractive index and Abbe number of each glass are also shown in the table below.

TABLE

| Component | 1 | 2 | 3 | 4 | 5 | 6 | 7 | 8 | 9 | 10 | 11 |
|---|---|---|---|---|---|---|---|---|---|---|---|
| $SiO_2$ | 32.2 | 26.9 | 27.4 | 32.4 | 27.4 | 28.0 | 21.9 | 24.8 | 25.0 | 21.7 | 22.3 |
| $B_2O_3$ | — | 2.8 | 5.8 | 2.8 | 5.8 | 3.9 | 8.4 | 8.0 | 8.4 | 8.4 | 9.5 |
| $Al_2O_3$ | — | 2.0 | — | — | — | — | — | — | — | 2.0 | 3.0 |
| $Li_2O$ | 3.0 | 1.5 | 1.0 | 1.0 | 1.0 | 1.6 | 0.5 | 2.0 | 1.0 | 1.0 | 0.5 |
| BaO | 32.9 | 35.1 | 35.1 | 24.2 | 20.1 | 33.0 | 23.0 | 19.4 | 21.7 | 32.4 | 36.8 |
| SrO | — | — | 5.0 | — | 10.0 | — | 5.0 | 5.0 | — | 5.0 | 5.0 |
| CaO | 3.0 | 3.0 | — | 17.0 | — | 4.6 | — | — | — | — | — |
| ZnO | 11.2 | 11.2 | 2.3 | 4.2 | 12.3 | 9.6 | 17.5 | 11.5 | 12.5 | 2.5 | 3.2 |
| $La_2O_3$ | 11.1 | 11.3 | 13.8 | 11.3 | 13.8 | 8.3 | 17.7 | 23.0 | 18.2 | 18.1 | 14.7 |
| $ZrO_2$ | 5.1 | 5.1 | 2.5 | 5.1 | 5.1 | 5.2 | 6.0 | 5.2 | 5.2 | 5.2 | 5.0 |
| $TiO_2$ | 1.3 | 1.1 | 7.1 | 2.0 | 4.5 | 4.2 | — | 1.1 | — | — | — |
| $Nb_2O_5$ | — | — | — | — | — | 1.1 | — | — | — | 3.8 | — |
| $Ta_2O_5$ | — | — | — | — | — | 0.5 | — | — | — | — | — |
| $WO_3$ | — | — | — | — | — | — | — | — | 3.0 | — | — |
| nd | 1.699 | 1.675 | 1.735 | 1.672 | 1.720 | 1.720 | 1.716 | 1.717 | 1.704 | 1.714 | 1.687 |
| γd | 47.4 | 48.6 | 39.9 | 49.2 | 44.0 | 43.6 | 47.8 | 48.7 | 48.4 | 47.7 | 51.5 |

The glasses having the compositions shown in the above table have a low crystal growth rate at a temperature lower than the liquid phase temperature and, therefore, a molten glass can be fed into a metallic mold through a feeder to produce lense and the like by press-molding.

While the invention has been described in detail and with reference to specific embodiment thereof, it will be apparent to one skilled in the art that various changes and modifications can be made therein without departing from the spirit and scope thereof.

What is claimed is:

1. An optical glass consisting essentially of, in % by weight 21.7 to 32.4% $SiO_2$;
0 to 9.5% $B_2O_3$;
0 to 3.0% $Al_2O_3$;
0.5 to 3.0% $Li_2O$;
34.2 to 49.3% $BaO+SrO+CaO+MgO+ZnO$, with the proviso of
19.4 to 36.8% BaO,
0 to 10.0% SrO,
0 to 17.0% CaO,
0 to 5.0% MgO, and
2.3 to 17.5% ZnO;
11.1 to 23.0% $La_2O_3$;
2.5 to 6.0% $ZrO_2$;
0 to 7.1% $TiO_2$;
0 to 3.8% $Nb_2O_5+Ta_2O_5$;
0 to 3.0% $WO_3$; and
0 to 5.0% PbO, said optical glass having a refractive index (nd) of 1.672 to 1.735 and an Abbe Number (νd) of 39.9 to 51.5, and being free of CdO and $ThO_2$.

* * * * *